United States Patent
Butler

(10) Patent No.: US 9,586,655 B1
(45) Date of Patent: Mar. 7, 2017

(54) RETRACTABLE SWIM PLATFORM AND STEPS FOR PONTOON BOATS

(71) Applicant: Thomas Butler, Cocoa, FL (US)

(72) Inventor: Thomas Butler, Cocoa, FL (US)

( * ) Notice: Subject to any disclaimer, the term of this patent is extended or adjusted under 35 U.S.C. 154(b) by 0 days.

(21) Appl. No.: 14/934,653

(22) Filed: Nov. 6, 2015

(51) Int. Cl.
| | |
|---|---|
| *B63B 27/14* | (2006.01) |
| *B60R 3/02* | (2006.01) |
| *B63B 17/00* | (2006.01) |
| *B63B 35/73* | (2006.01) |
| *B63B 35/00* | (2006.01) |

(52) U.S. Cl.
CPC ............ *B63B 27/14* (2013.01); *B60R 3/02* (2013.01); *B63B 17/00* (2013.01); *B63B 27/146* (2013.01); *B63B 35/73* (2013.01); *B63B 2027/141* (2013.01); *B63B 2035/004* (2013.01)

(58) Field of Classification Search
CPC ..... B63B 27/14; B63B 27/141; B63B 27/143; B63B 27/146; B63B 2027/141; B60R 3/02
USPC .......................................... 114/362; 280/166
See application file for complete search history.

(56) References Cited

U.S. PATENT DOCUMENTS

| | | | | |
|---|---|---|---|---|
| 3,488,066 | A * | 1/1970 | Hansen | ............. B60R 3/02 280/163 |
| 3,503,357 | A | 3/1970 | Ferris | |
| 4,116,457 | A * | 9/1978 | Nerem | ............. B60R 3/02 280/166 |
| 4,180,143 | A * | 12/1979 | Clugston | ............. B60R 3/02 182/91 |
| 4,623,160 | A * | 11/1986 | Trudell | ............. B60R 3/02 182/127 |
| 4,971,315 | A | 11/1990 | Rector | |
| 4,993,341 | A | 2/1991 | Merkel | |
| 5,085,164 | A | 2/1992 | Whitton | |
| 5,085,450 | A * | 2/1992 | DeHart, Sr. | ............. B60R 3/02 280/166 |
| 6,082,751 | A * | 7/2000 | Hanes | ............. B60R 3/02 280/163 |
| 6,789,648 | B2 * | 9/2004 | Cook | ............ B63B 27/146 114/362 |
| 6,868,799 | B2 | 3/2005 | Wright | |

(Continued)

OTHER PUBLICATIONS

Pontoon Seats, Seating and Furniture, retrieved on Nov. 6, 2015, http://www.everythingpontoon.com, 8 pages.

(Continued)

*Primary Examiner* — Frederick L Lagman
(74) *Attorney, Agent, or Firm* — Brian S. Steinberger; Law Offices of Brian S. Steinberger, P.A.

(57) ABSTRACT

Systems, devices, and methods for providing a swinging system and platform assembly that deploys a swim platform from the front of a pontoon boat which is mounted underneath the deck between the pontoons in a raised position adjacent to the underside of the pontoon deck. The platform assembly, when deployed, provides a safe method for users of pontoon boat vessels to access the front deck area from land or from a body of water. The platform deploys from two pivoting frames affixed to the bottom of the deck, which is powered by an actuator with the push of a button on the control panel. For deployment, the platform is both lowered and extended out from the pontoon boat. A powered actuator positions the platform in the deployed position for use and then retracts the platform for storage.

13 Claims, 11 Drawing Sheets

(56) References Cited

U.S. PATENT DOCUMENTS

| | | | |
|---|---|---|---|
| 7,028,632 B2 | 4/2006 | Blank | |
| 7,168,722 B1 * | 1/2007 | Piotrowski | B60R 3/02 |
| | | | 280/166 |
| 7,866,275 B2 * | 1/2011 | Schmidt, Jr. | B63B 27/36 |
| | | | 114/362 |
| 7,946,243 B1 * | 5/2011 | Ulrich | B63B 27/16 |
| | | | 114/362 |
| 8,056,496 B1 | 11/2011 | Bussa | |
| 8,375,880 B1 | 2/2013 | St. Clair | |
| 2008/0157500 A1 * | 7/2008 | Raley | E06C 1/387 |
| | | | 280/166 |
| 2009/0078188 A1 * | 3/2009 | Thomas | B63B 27/146 |
| | | | 114/362 |
| 2009/0189365 A1 * | 7/2009 | Ferguson | B60R 3/02 |
| | | | 280/166 |
| 2010/0051387 A1 * | 3/2010 | Krobot | B60R 3/02 |
| | | | 182/158 |
| 2011/0023770 A1 * | 2/2011 | Brown | B63B 27/143 |
| | | | 114/362 |
| 2015/0203177 A1 * | 7/2015 | Mueller | B63B 27/146 |
| | | | 114/285 |

OTHER PUBLICATIONS

Accordion Gangplank 2, Xwerx Direct Boating Products, retrieved on Nov. 6, 2015, http://www.xwerxdirect.com/product/accordion-gangplank-2, 2 pages.

Dock and Pontoon Boat Ladders, retrieved on Nov. 6, 2015, http://www.dockandpontoonladders.com/, 2 pages.

* cited by examiner

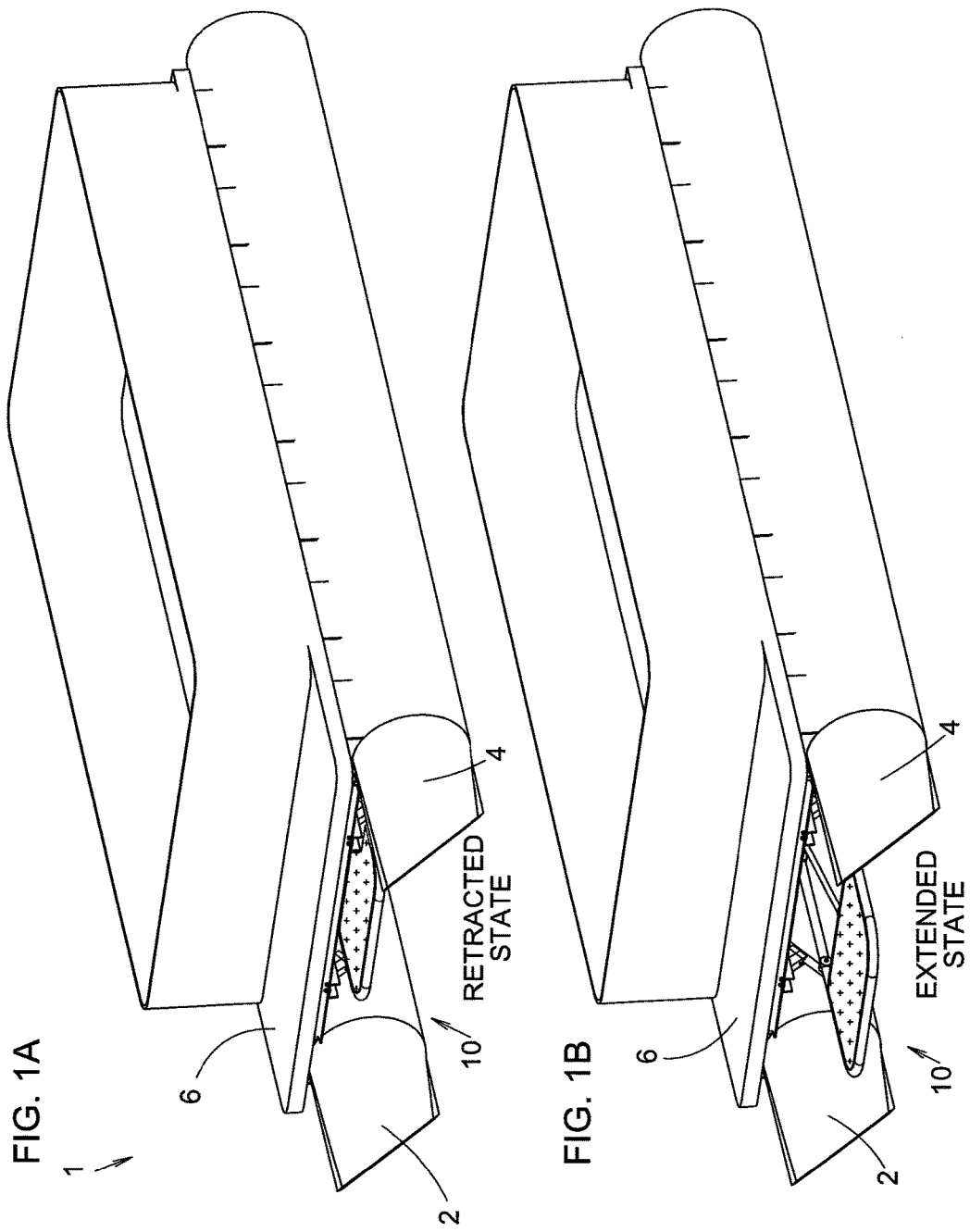

RETRACTED STATE

EXTENDED STATE

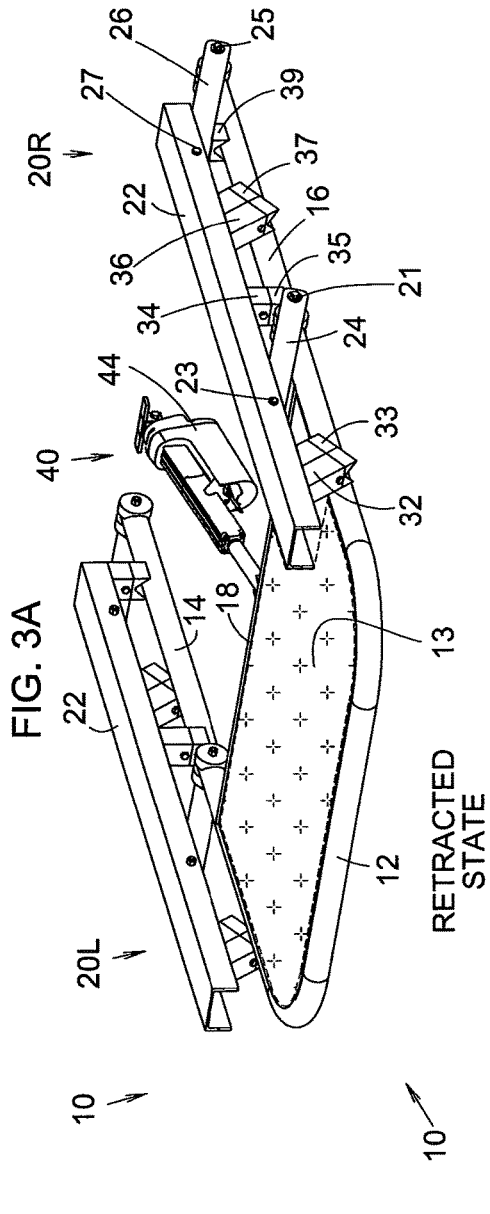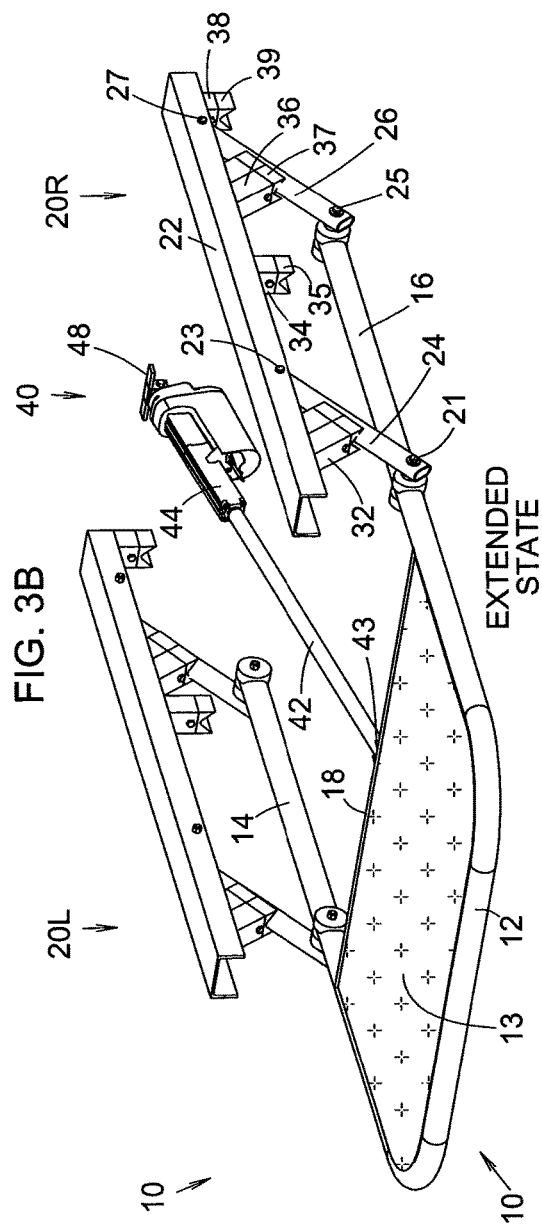

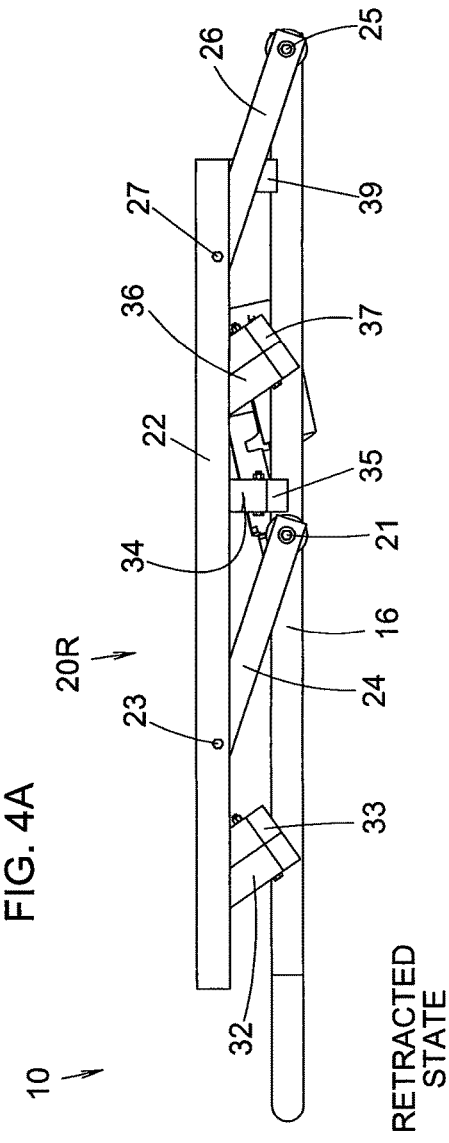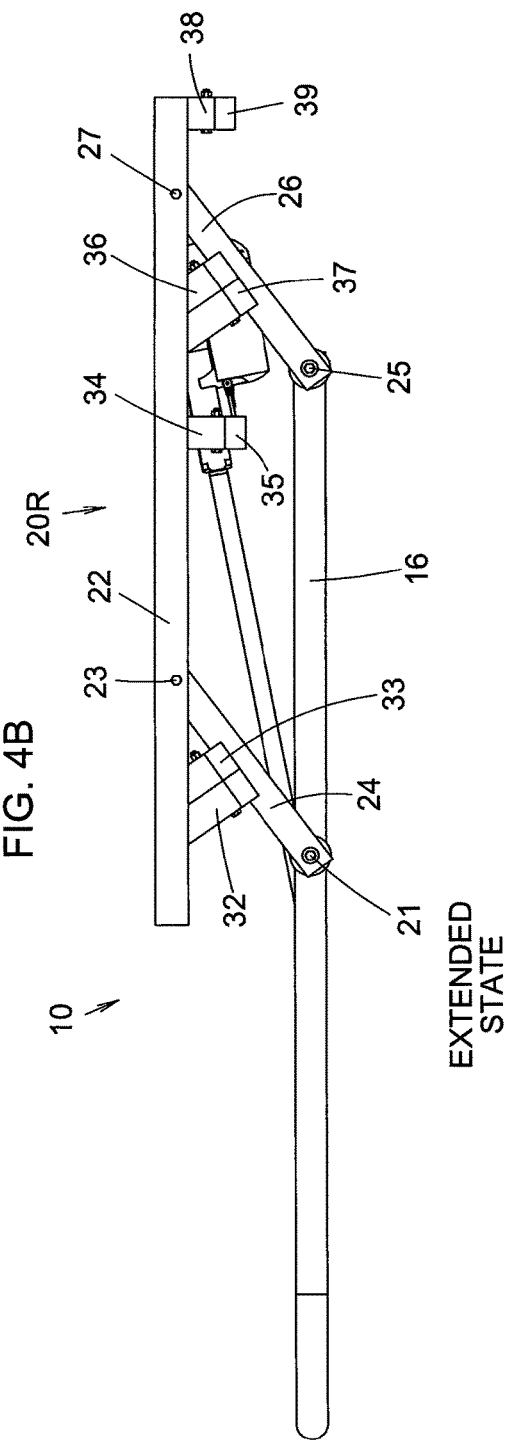

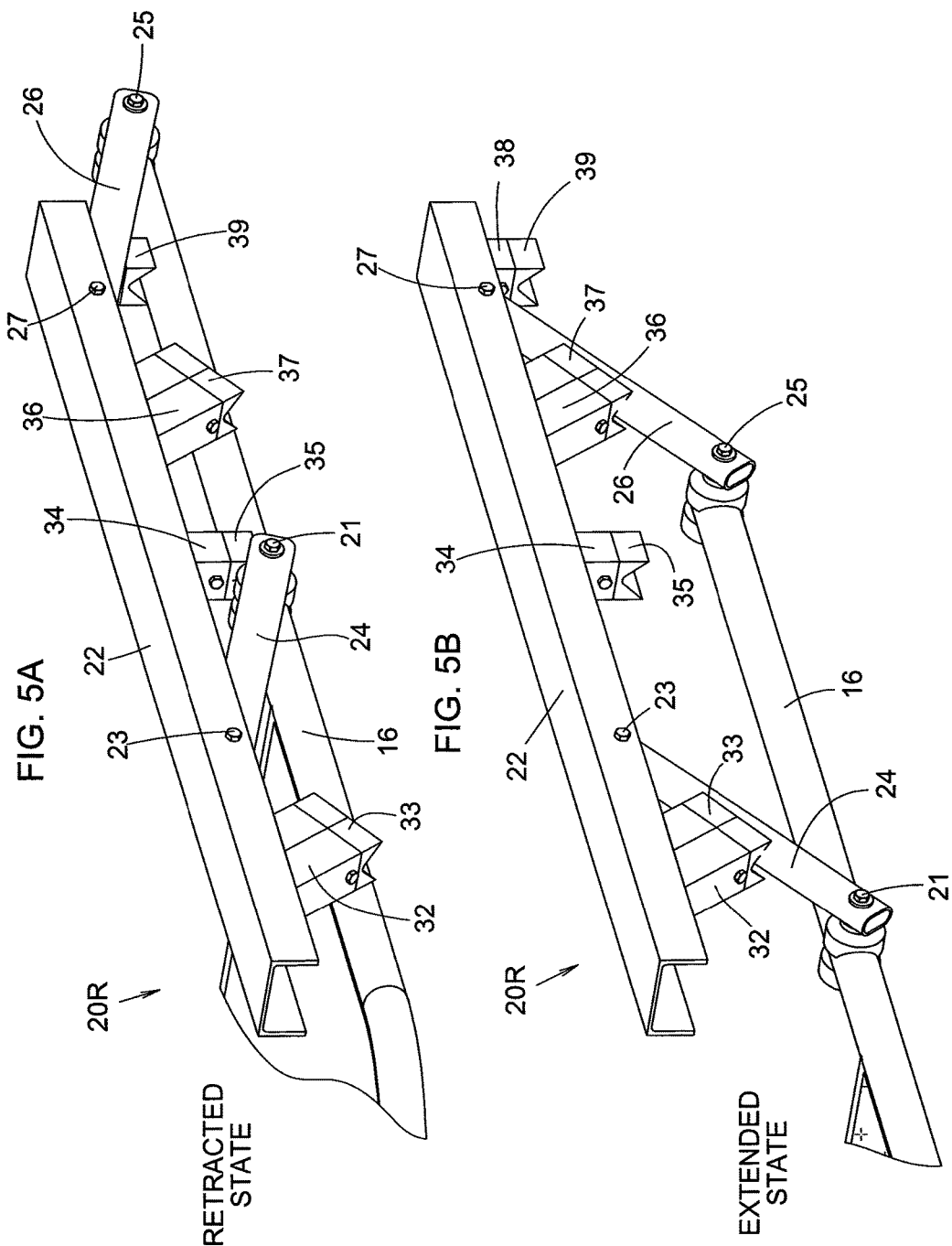

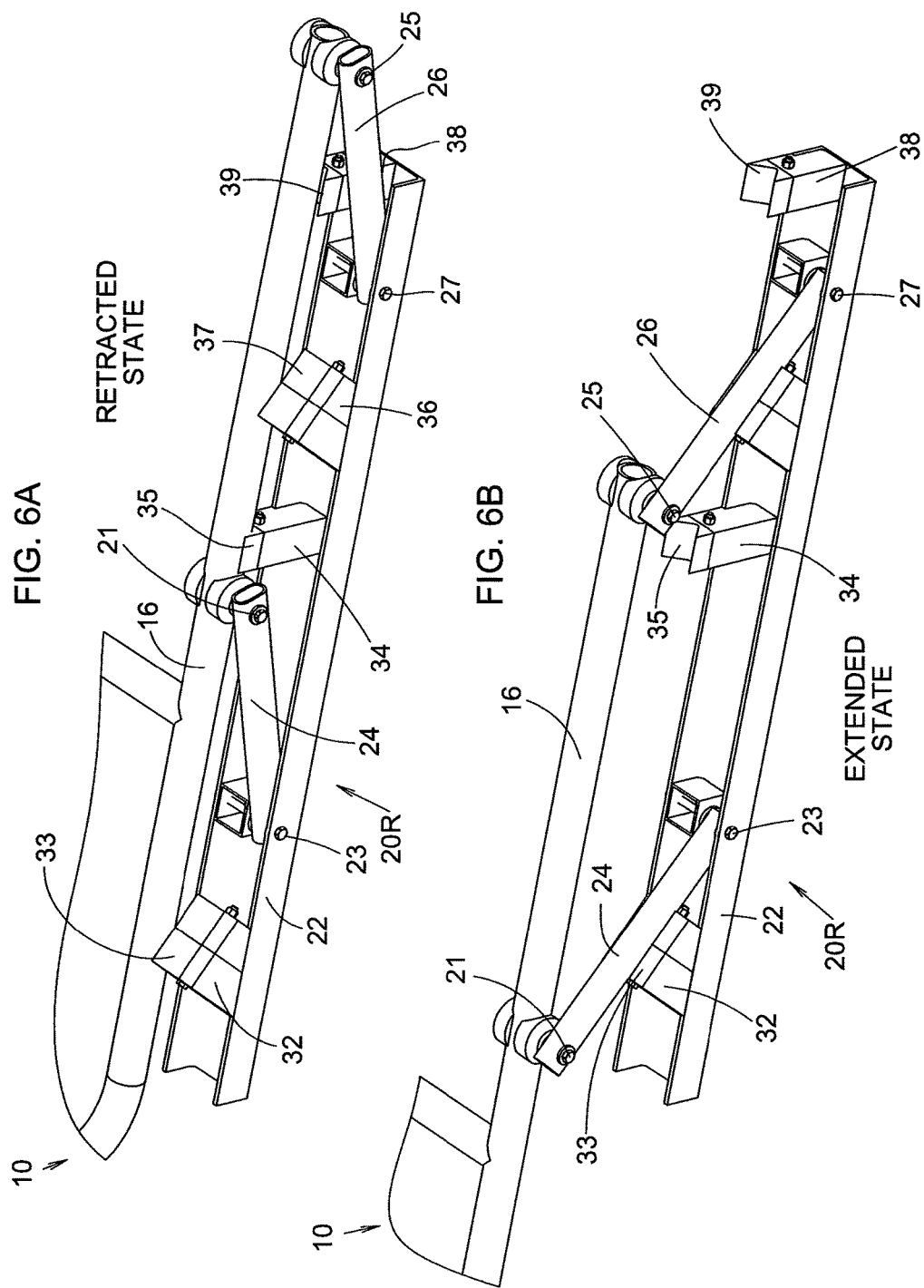

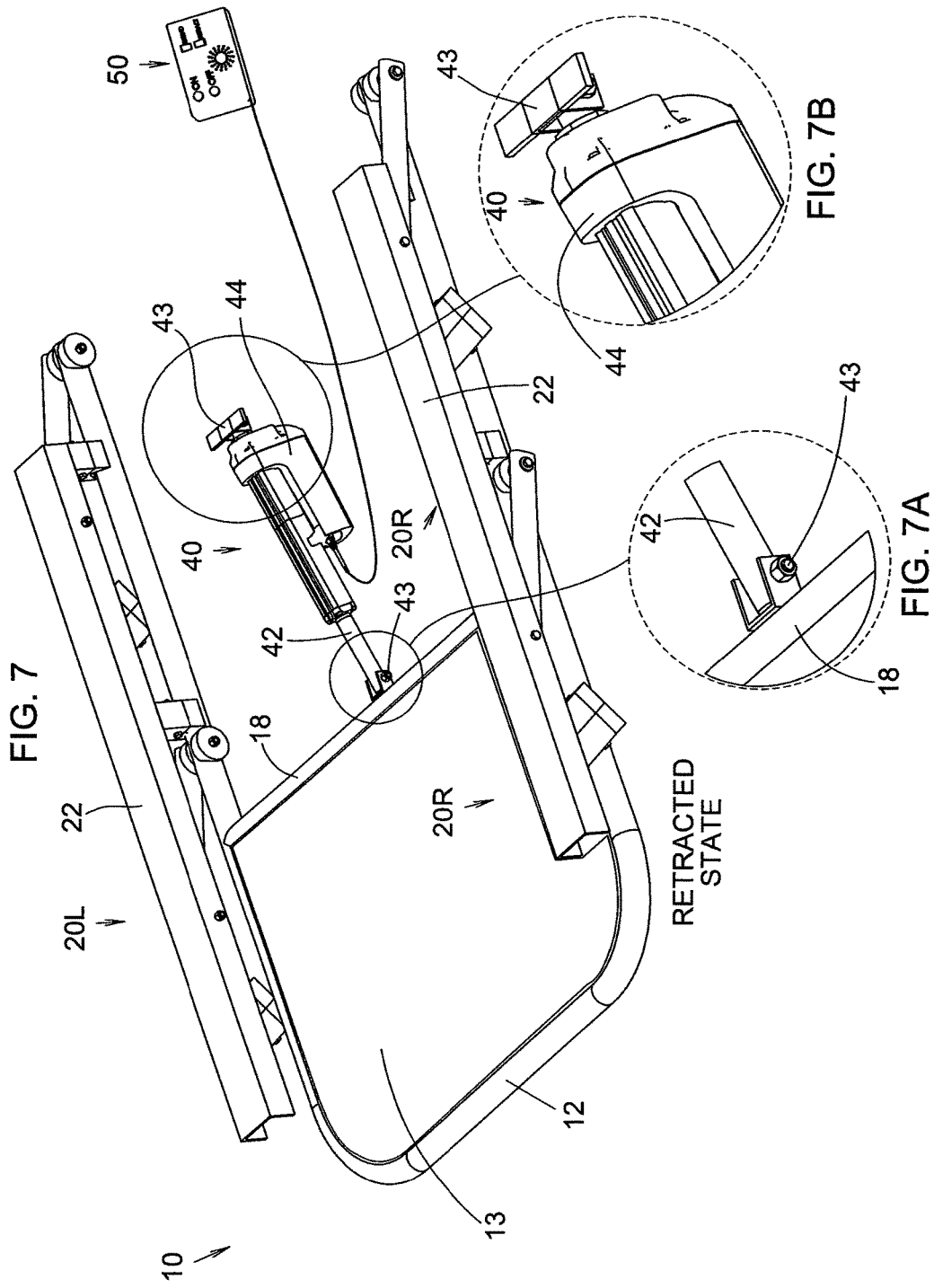

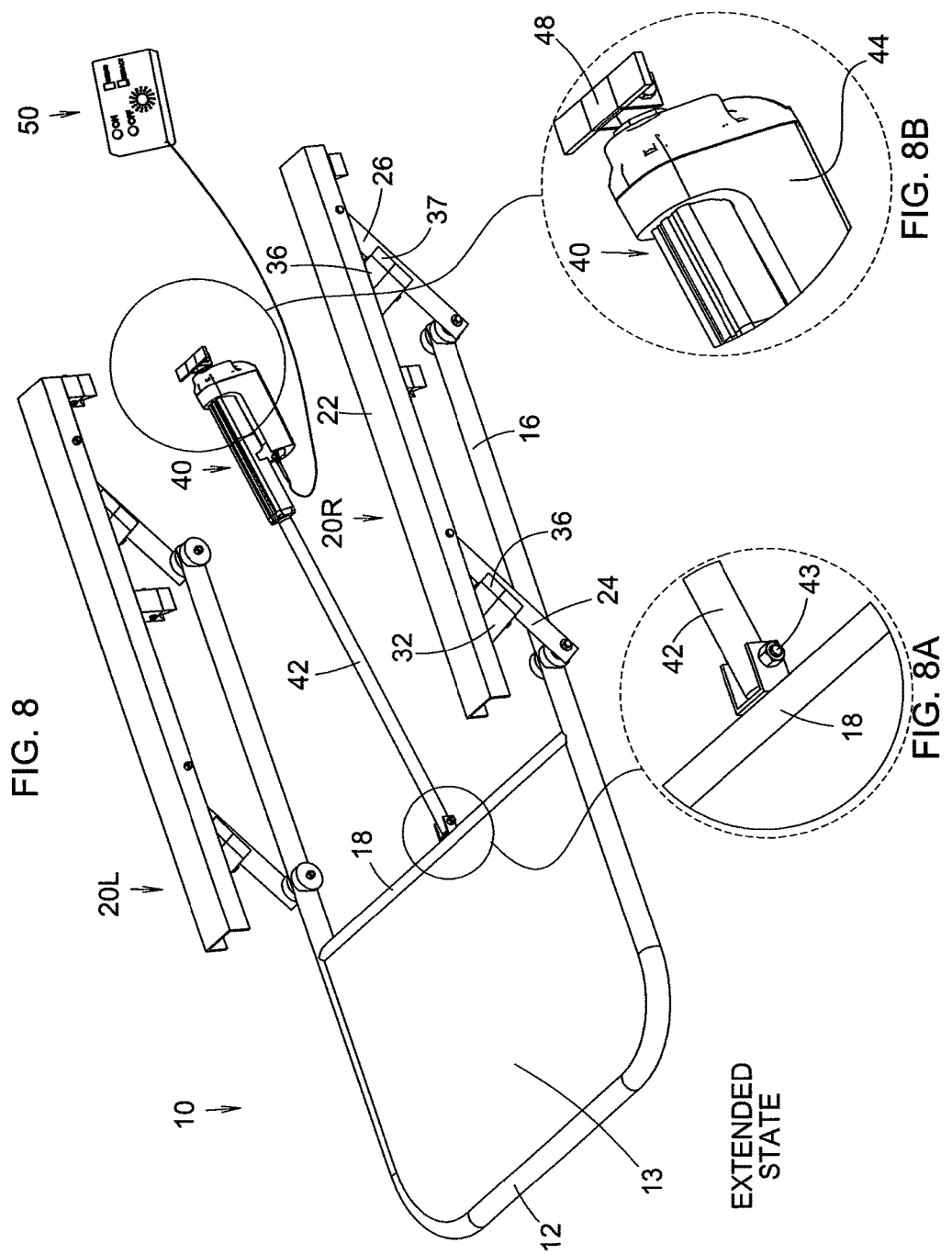

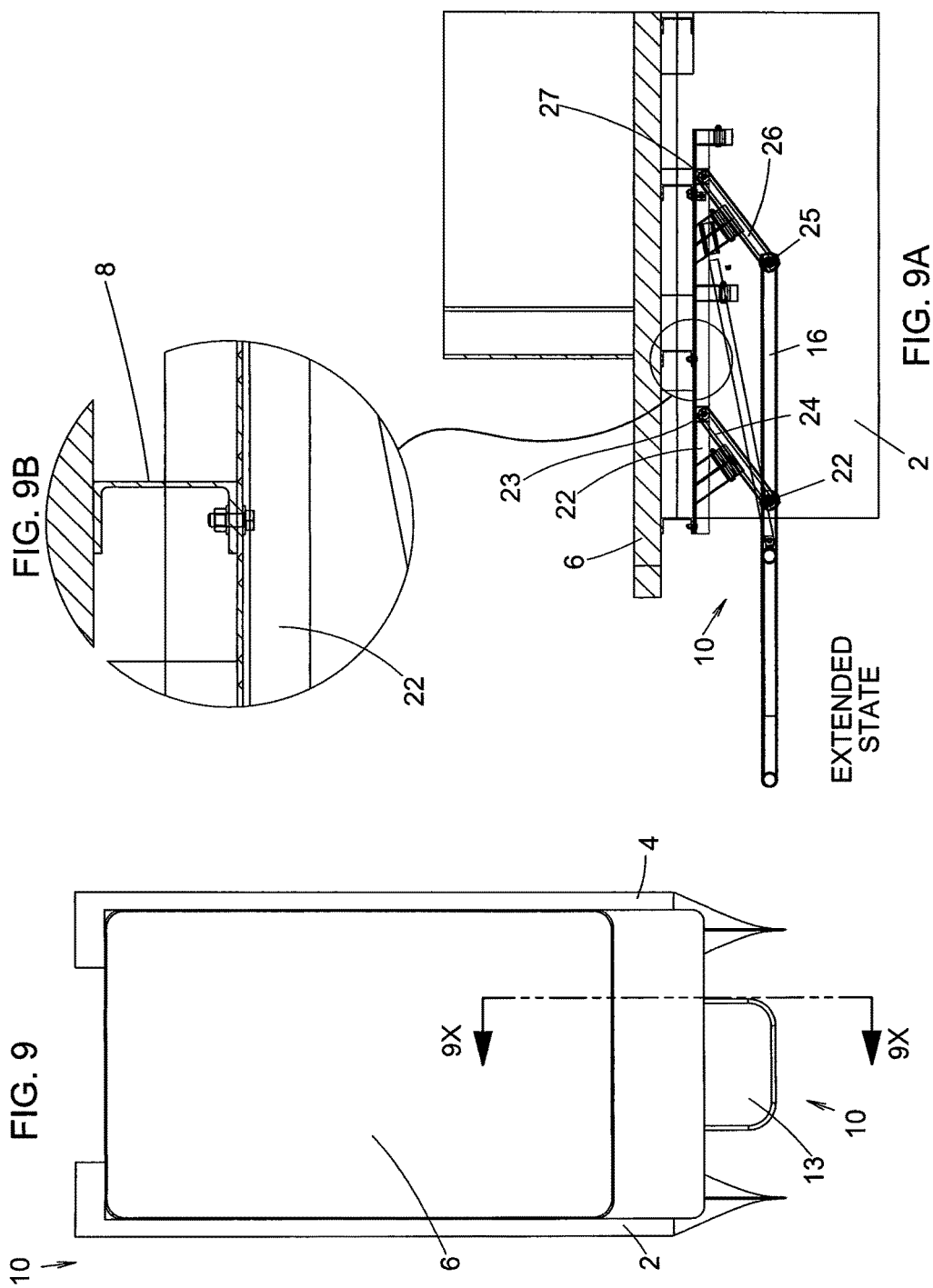

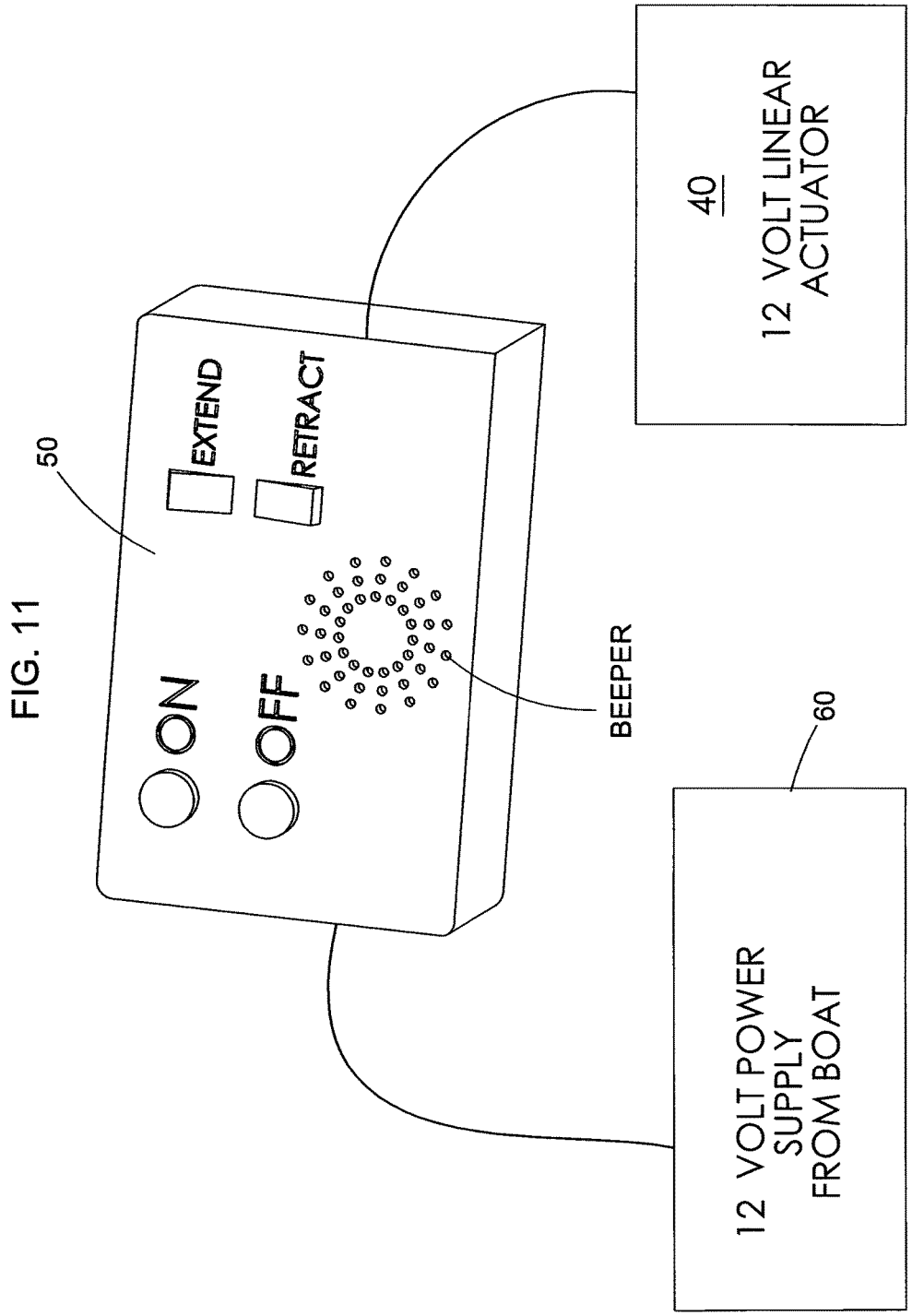

RETRACTABLE SWIM PLATFORM AND STEPS FOR PONTOON BOATS

FIELD OF INVENTION

This invention relates to swim platforms, and in particular to systems, devices, and methods for providing an automatic power driven swim platform that rests in a stowed raised and retracted position underneath a pontoon deck between pontoon floats, and extends out to a lowered extended position adjacent to the water level allowing for users to safely board the platform or pass from the platform into the water.

BACKGROUND AND PRIOR ART

Pontoon boats generally have platform type decks that are supported length wide under side edges by floatation units, referred to as pontoons. As such, the pontoon boats have a substantial open area between the pontoons underneath each vessel which is generally unused for any purpose.

Additionally, the height of the raised platform deck makes it difficult for someone to slide into the water from the platform or move easily from the water onto the deck, without having to do excessive climbing up or down.

Factory of aftermarket, hook type ladders have been popular to attach to the main platform structures. However, these devices still require the user to have to climb up or down from the raised platform deck to reach the water, or come out of the water, which can be made further difficult when having climb a small, slippery ladder. To exit or enter the pontoon boat from the front or back, one must jump on or off the boat. Injuries occur annually from scrapes and bruises to more serious cuts and broken bones. To date, pontoon boats have been a challenge getting on and off them safely.

Additionally swim ladders are affixed at the rear of motorized pontoon boats near the engine and prop and are the presence of sharp edges, gas fumes and fluids floating on the top of the water from the engine.

In addition, the side attached ladders are either kept on the side of the pontoon boat and not stowed, or if stowed need to be placed on top of the platform deck taking up valuable space on the top of the deck.

Various types of gangplanks, swim platforms, and plank/ramps have been proposed for pontoon boats. See for example, U.S. Pat. No. 4,993,341 to Merkel; U.S. Pat. No. 5,085,164 to Whitton; U.S. Pat. No. 6,868,799 to Wright, U.S. Pat. No. 7,028,632 to Blank and U.S. Pat. No. 8,056,496 to Bussa. However, these devices have inherent problems and do not solve the main problems.

Although the Merkel gangplank has a power control, the gangplank basically rolls in and out on horizontal tracks similar to a drawer, and remains parallel and spaced above the water in both retracted and extended positions. In the extended position, the user would have to jump into the water similar to a diving board. Additionally, the user would have to physically climb up out of the water to reach the outer edge of the gangplank.

The Whitton device requires dual horizontal tracks, that are bent to vertical orientation, which allow the platform to move from a retracted raised position to an extended lower position. However, this device requires elaborate pulleys and a winch with cables, where the winch must be mounted on top of the pontoon deck platform, which takes away valuable space on the pontoon deck platform. Additionally, horizontal and vertical track system only allows for one lower position, and one raised position and nothing in between.

The Wright and Blank devices have stowable rigid ramps, that when pulled out can pivot to a slanted position. However, the outer ends of the extended ramps are intended to rest on solid surfaces, and not on the water. Additionally, these devices are manually operated and must be pulled out or pushed in, which can be difficult to use on the water away from a dock or land. Thus, they would be impractable to be used as a swim platform the user can easily and safely onto or swim off from.

Furthermore, the prior art patents generally keep their gangplanks, swim platforms, and plank/ramps, in generally aligned position when in the retracted positions. Once these devices are extended the ends of the extended gangplanks, swim plafforms, and plank/ramps can swing and sway side to side and not be stable.

Thus, the need exists for solutions to the above problems with the prior art.

SUMMARY OF THE INVENTION

A primary objective of the present invention is to provide systems, devices, and methods for providing an automatic power driven swim platform that rests in a stowed raised and retracted position underneath a pontoon deck between pontoon floats, and can automatically extend out to selected lowered positions adjacent to the water level, so that a user can easily and safely board the platform or pass from the platform into the water.

A secondary objective of the present invention is to provide systems, devices, and methods for providing retractable swim platform that rests in a stowed raised and retracted position underneath a pontoon deck between pontoon floats, which does not take up any space on the side of the pontoon boat or on top of the pontoon deck.

A third objective of the present invention is to provide systems, devices, and methods for providing retractable swim platform that rests in a stowed raised and retracted position underneath a pontoon deck between pontoon floats and extends to a stable aligned position where the platform would not tend to swing or sway side to side.

A fourth objective of the present invention is to provide systems, devices, and methods for providing retractable and extendable a swim platform for pontoon boats that does not use tracks for sliding or rolling edges of the platform therefrom.

The novel retractable and extendable swim platform is intended to provide for safe entry and exit from the front of a pontoon boat. The platform can be affixed to four legs that area attached to two separate frames which allow the platform to swing forward and back, by a powered actuator, that forces the platform into a set of stops.

Theses stops position the platform and keep it aligned when it's deployed for use or stowed. All pivot points have specifically designed bushings to allow smooth operation and prevent wear. The stops are welded to the frames and have rubber "Y" shape piece that fits into the welded details. These rubber pieces are what the legs press into when the platform is deployed for use. They position the platform to prevent side to side motion. The stowed stops are similar in design, but instead of having a "Y" shape, one of the sides where the "Y" shape is has been cut off, leaving a flat surface for the platform to pull into, with only the outer "Y" sides remaining. There is a limit switch mounted on the rear of the frame which allows a beeper to sound when the key is used to start the engine and will sound alarm until platform is fully stowed. The same beeper will also sound when the platform is in motion. The actuator itself is protected by a sewn, water-resistant cover that protects the actuator from water damage.

Further objects and advantages of this invention will be apparent from the following detailed description of the presently preferred embodiments which are illustrated schematically in the accompanying drawings.

BRIEF DESCRIPTION OF THE FIGURES

FIG. 1A is a perspective view of the retractable and extendable swim platform system attached underneath a pontoon deck between pontoon floats in a retracted position.

FIG. 1B is another perspective view of the retractable and extendable swim platform system attached underneath the pontoon deck between pontoon floats shown in FIG. 1A in an extended position.

FIG. 3A is a perspective view of the retractable and extendable swim platform system of the preceding figures in a retracted raised position.

FIG. 3B is a perspective view of the retractable and extendable swim platform system of the preceding figures in an extended lowered position.

FIG. 4A is a side view of the retractable and extendable swim platform system of FIG. 3A in the retracted raised position.

FIG. 4B is a side view of the retractable and extendable swim platform system of FIG. 3B in the extended lowered position.

FIG. 5A is a perspective side view of the retracted raised swim platform of FIG. 4A.

FIG. 5B is a perspective side view of the extended lowered swim platform of FIG. 4B.

FIG. 6A is a perspective bottom view of the retracted raised swim platform of FIG. 5A.

FIG. 6B is a perspective bottom view of the extended lowered swim platform of FIG. 5B.

FIG. 7 is an upper perspective upper view of the swim platform system of the preceding FIGURES with an actuator in a retracted position.

FIG. 7A is an enlarged view of the actuator rod to platform mount in FIG. 7.

FIG. 7B is an enlarged view of the actuator rear mount in FIG. 7.

FIG. 8 is an upper perspective upper view of the swim platform of preceding FIGURES with an actuator in an extended position.

FIG. 8A is an enlarged view of the actuator rod to platform mount in FIG. 8.

FIG. 8B is an enlarged view of the actuator rear mount in FIG. 8.

FIG. 9 is a top view of a pontoon boat with the retractable and extendable swim platform system mounted underneath the platform deck between pontoon floats.

FIG. 9A is a side cross-sectional view of the swim platform mounted underneath the platform deck of the pontoon boat along arrows 9X.

FIG. 9B is an enlarged view of the channel structure for mounting the platform of FIG. 9.

FIG. 11 is a perspective view of the actuator controller for the retractable and extendable swim platform mounted underneath the pontoon deck between the pontoon floats.

DESCRIPTION OF THE PREFERRED EMBODIMENTS

Figure 2A:
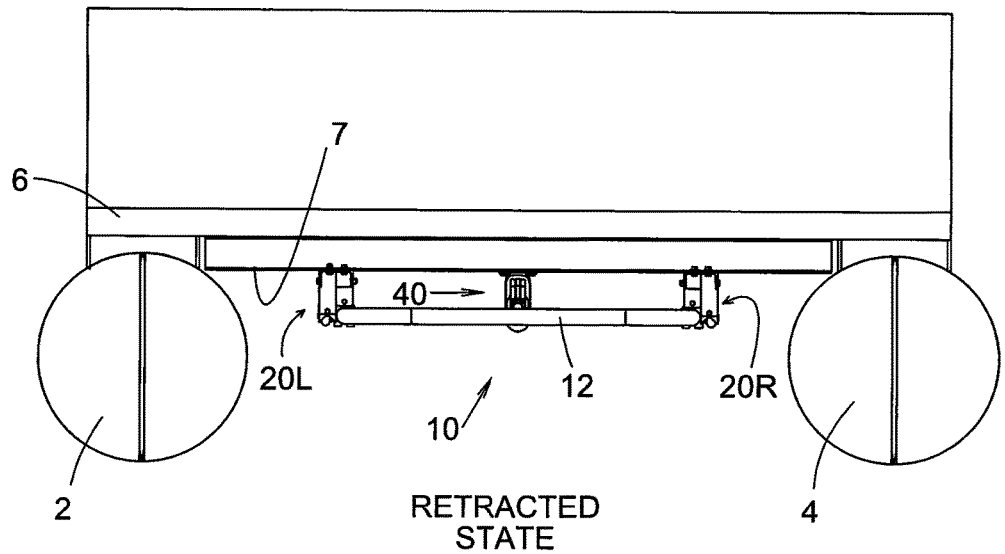
FIG. 2A is a front end view of the swim platform system attached underneath the pontoon deck of FIG. 1A in a retracted raised position.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation. In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

A list of components will now be described.

1. retractable/extendable platform system installed on pontoon boat
2. left pontoon float
4. right pontoon float
6. pontoon deck
7. underside of pontoon deck
8. channel structure on underside of pontoon deck
10. platform system
12. front frame members
13. surface of platform, can be roughened for traction
14. left side rearwardly extending leg
16. right side rearwardly extending leg
18. rear frame member
20R right side pivoting frame
20L left side pivoting frame
21. lower pivot point for front swing arm 24
22. elongated mounting channel
23. upper pivot point for front swing arm 24
24. front swing arm
25. lower pivot point for rear swing arm 26
26. rear swing arm
27. upper pivot point for rear swing arm 26
32. deployed angled stops (front)
33. resilient groove ends 34. stowed vertical stop (front)
35. resilient groove end
36. deployed angled stops (rear)
37. resilient groove ends
38. stowed vertical stop (rear)
39. resilient groove end
40. actuator assembly
42. piston
43. pivot end for piston arm
44. actuator motor
48. pivoting rear mount
50. actuator control
60. boat power supply FIG. 1A is a perspective view 1 of the retractable and extendable swim platform system 10 attached underneath a pontoon deck 5 between a pair of pontoon floats 2, 4, in a retracted position. FIG. 1B is another perspective view 1 of the retractable and extendable swim platform system 10 attached underneath the pontoon deck 5 between pontoon floats 2, 4 shown in FIG. 1A in an extended position.

Figure 2B:
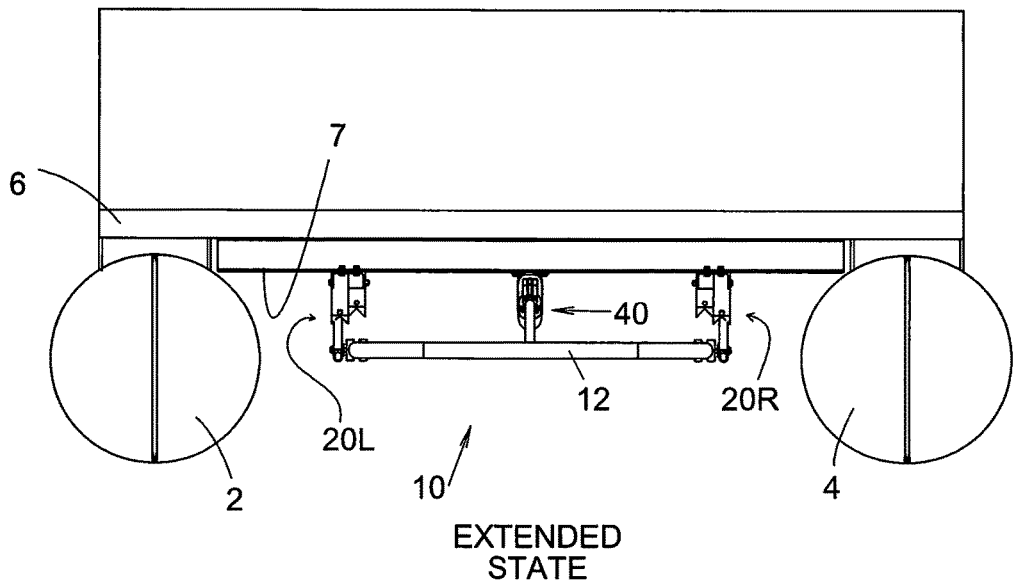
FIG. 2B is a front end view of the swim platform system attached underneath the pontoon deck of FIG. 1B in an extended lowered position.

FIG. 2A is a front end view of the swim platform system 10 attached underneath the pontoon deck 6 of FIG. 1A in a retracted raised position. FIG. 2B is a front end view of the swim platform system 10 attached underneath the pontoon deck of FIG. 1B in an extended lowered position.

FIG. 3A is a perspective view of the retractable and extendable swim platform system 10 of the preceding figures in a retracted raised position. FIG. 3B is a perspective view of the retractable and extendable swim platform system 10 of the preceding figures in an extended lowered position.

Referring to FIGS. 1A-3B, the swim platform system 10 can include a platform surface 13 with front frame members 12 and rear frame member 18, with right side rearwardly extending leg 14, and left side rearwardly extending leg 16. A right side pivoting frame 20R can be pivotally attached to the right side leg 16, and a left side pivoting frame 20L can be pivotally attached to the left side leg 14, with the pivoting frames 20R, 20L fixably attached to an underside 7 of the pontoon deck 6. Stops 32, 34, 36, 38 (which will be described in greater detail) extending down from elongated mounting channel(s) 22 can limit the raised and lowered extended position of the platform system 10. An actuator assembly 40 which will also be described later in greater detail will control the lowering and extending of the platform system 10 and retracting and raising of the platform system 10.

FIG. 4A is a side view of the retractable and extendable swim platform system 10 of FIG. 3A with the right side pivoting frame 20R in the retracted raised position. FIG. 4B is a side view of the retractable and extendable swim platform system 10 of FIG. 3B with the right side pivoting frame 20R in the extended lowered position.

FIG. 5A is a perspective side view of the platform system of FIG. 4A with the right side pivoting frame 20R in the retracted position. FIG. 5B is a perspective side view of the swim platform system 10 of FIG. 4B with the right side pivoting frame 20R in the raised retracted position.

FIG. 6A is a perspective bottom view of the swim platform system 10 of FIG. 5A with the right side pivoting frame 20R in a raised retracted position. FIG. 6B is a perspective bottom view of the swim platform system of FIG. 5B with the right side pivoting frame 20R in a lowered extended position.

FIG. 7 is an upper perspective upper view of the swim platform system 10 of the preceding FIGURES with an actuator 40 in a retracted position. FIG. 7A is an enlarged view of the actuator rod 42 with pivoting point 43 to platform mount frame 18 in FIG. 7. FIG. 7B is an enlarged view of the rear pivoting mount 43 of the actuator 40 in FIG. 7.

FIG. 8 is an upper perspective upper view of the swim platform system 10 of the preceding FIGURES with an actuator 40 in an extended position. FIG. 8A is an enlarged view of the actuator rod 42 with pivoting point 43 to platform mount frame 18 in FIG. 8. FIG. 8B is an enlarged view of a rear pivot mount 43 of the actuator 40 in FIG. 8.

FIG. 9 is a top view of a pontoon boat with the retractable and extendable swim platform system 10 mounted underneath the pontoon deck 6 between pontoon floats 2, 4.

FIG. 9A is a side cross-sectional view of the swim platform system 10 mounted underneath the pontoon deck 6 of the pontoon boat along arrows 9X. FIG. 9B is an enlarged view of the channel structure 8 underneath the pontoon deck 6 for mounting the swim platform system 10 of FIG. 9.

Figures 10, 10A:
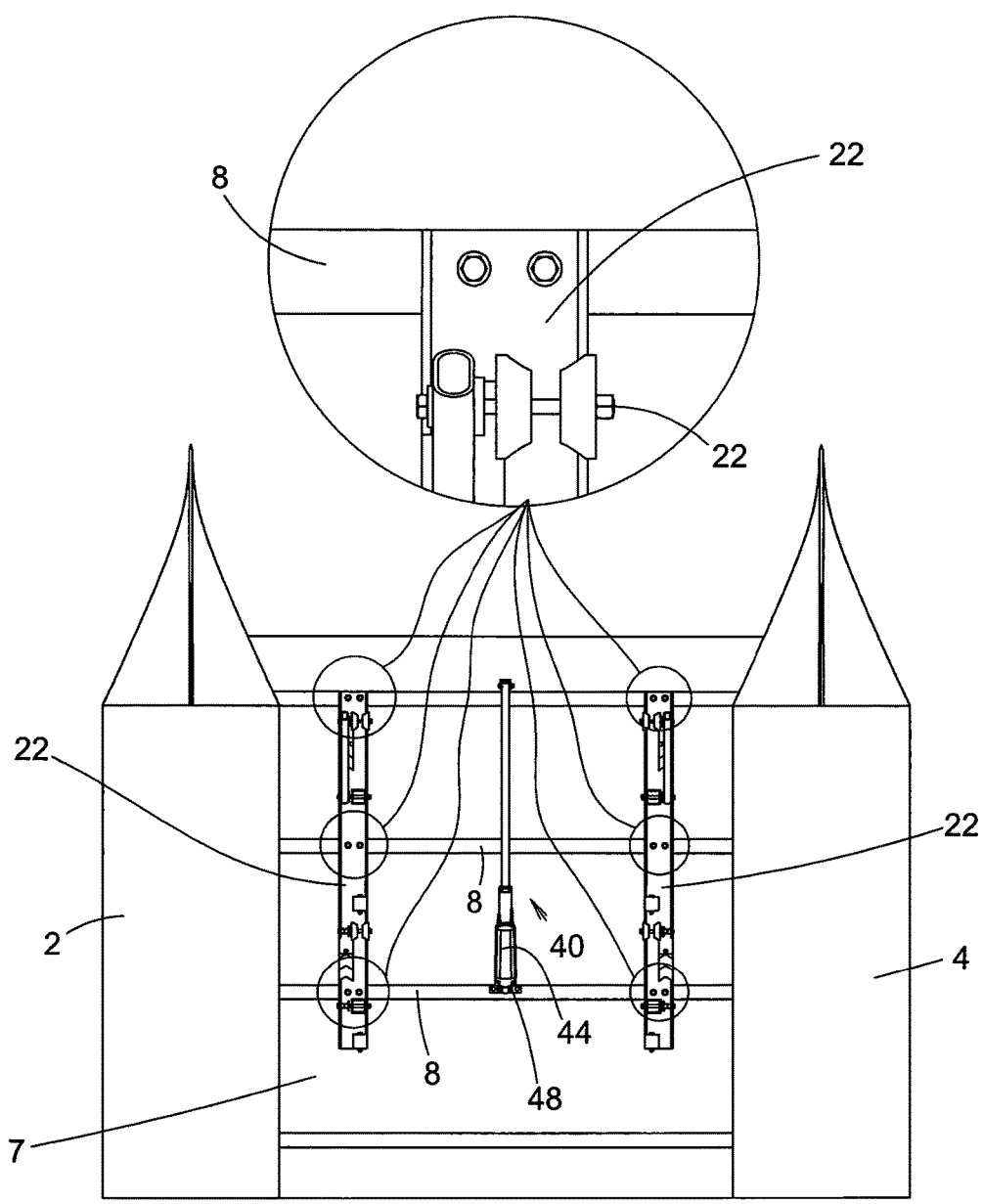
FIG. 10 is a bottom view of the pontoon boat with the retractable and extendable swim platform system mounted underneath the platform deck between pontoon floats of FIG. 9.
FIG. 10A is an enlarged view of the pontoon boat channel structure and platform mounting channel of FIG. 10.

FIG. 10 is a bottom view of the pontoon boat with the retractable and extendable swim platform system 10 mounted underneath the platform deck 6 between pontoon floats 2, 4 of FIG. 9. FIG. 10A is an enlarged view of the pontoon boat channel structure 8 and platform mounting channel 22 of FIG. 10.

FIG. 11 is a perspective view of the actuator controller 50 for the retractable and extendable swim platform system mounted underneath the pontoon deck between the pontoon floats, which controls a boat power supply 60 (such as a 12 volt power supply) to operate actuator 40 (such as a 12 volt linear actuator).

Referring to FIGS. 1A, 1B, 9, 9A, 9B, 10, 10A, the platform system 10 can be mounted to the underside 7 of the pontoon deck 6 by fasteners (such as bolts, and screws) that attach the elongated mounting channels 22 on the right and left pivoting frames 20R, 20L to the parallel pontoon channel structure(s) that exist on the underside 7 of the pontoon deck 6. Additionally, the actuator motor 44 can be attached to one of the channel structure(s) by a pivoting rear mount 48.

The operation of the pivoting frames 20R and 20L will now be described. Referring to FIGS. 3A-8B and 11, each of the pivoting frames 20R, 20L, include an elongated mounting channel 22 having a generally upside down U shaped configuration, which includes a pair of rearwardly facing deployed angled stops (front) 32 that are attached at their base inside of the channel 22, and a pair of rearwardly facing deployed angled stops (rear) 36 that are attached at their base inside of the channel 22, with both pairs of stops 32, 36 along a straight line. The stops 32, 36 can be angled at approximately 35 degrees, and can include outer exposed ends 33, 37 having grooves, such as but not limited to a V shaped grooves, that can be formed from a resilient material such as rubber, and the like.

Additionally, each of the elongated channel(s) 22 (in pivoting frames 20R, 20L) includes a stowed vertical stop (front) 34 and stowed vertical stop (rear) 38 mounted at their base inside of and at a perpendicular orientation to the channel 22, and both stops 34, 38 along another straight line parallel to the straight line formed from stops 32, 36. The stops 34, 38 can include outer exposed ends 35, 39 having grooves, such as but not limited to V shaped grooves, that can be formed from a resilient material such as rubber, and the like.

In the retracted position as shown in FIGS. 4A, 5A, 6A, and 7, stops 32, 36 and groove ends 33, 37 are off to the side and spaced from right side rearwardly extending leg 16, with piston 42 in a contracted state in actuator 44.

Operating controller 50 to run the actuator 40 to an extend mode causes piston 42 to extend out from actuator motor 44 so that the outer end of the piston 42 pushes against rear frame member 18 on the platform 13 to extend from elongated mount channels 22. As the piston 42 extends out, swing arms 24, 26 begin to rotate in a clockwise direction along their pivot points 21, 25 relative to leg 16, and along their other pivot points 23, 27 relative to elongated mounting channel 22. This rotational movement can run until the groove ends 33, 37 of stops 32, 36 fit and abut about sides of the swing arms 24, 26, as shown in FIGS. 4B, 5B, 6B and 8. The groove ends 33, 37 fit about sides of the swing arms 24, 26 which keeps the extended pivoting frames 20R, 20L, in a stable aligned position, so that the lowered platform 13 and frame members 12, 18 does not sway or shift side to side.

Operating controller 50 to reverse the platform system into a raised and retracted position causes piston 42 to contract into actuator motor 44 so that the outer end of the piston 42 pulls rear frame member 18 on platform 13 to retract into the space formed from between channels 22 and raised upward. As the piston 42 retracts, swing arms 24, 26 begin to rotate in a counter-clockwise direction along their pivot points 21, 25 relative to leg 16, and along their other pivot points 23, 27 relative to elongated mounting channel 22. This rotational movement can run until the groove ends 35, 39 of stops 34, 38 fit and abut about right side rearwardly extending leg 16 as shown in FIGS. 4A, 5A, 6A and 7. The groove ends 35, 39 fit about the top of leg 16 which keeps the retracted pivoting frames 20R, 20L, in a stable aligned position, so that the raised platform 13 and frame members 12, 18 does not sway or shift side to side.

A description of the platform system 10 for mounting to the underside 7 of the deck 6 will now be described. The platform system 10 assembly starts with 2 frames 20R, 20L that can attach to the underside 7 of the deck 6 between the pontoon floats 2, 4. There are parallel rows of aluminum channel structures 8 that run from the front of the boat to the rear of the boat which is what the deck 6 attaches to. The frames 20R, 20L can bolt to these channel structures 8 in three spots: front, center, and rear. The channel structures 8 can be attached with ⅜" bolts, washers, and lock nuts.

The frames 20R, 20L, can house the axle blocks and platform stops 32, 34, 36, 38. There are 4 swinging arms 24, 26 that can attach to the frames 20R, 20L, 2 on the port side and 2 on the starboard side. There can be 2 bushings that can fit into the arm holes that the axle bolt goes thru. These arms 24, 26 can then attach to the platform at the other end. There are also 2 bushings that fit into the arm holes coupled with 2 coped bushings that transition from the arms 24, 26 which are flat, to the platform pipe leg 16 which is round. This assembly can get bolted together with ⅜" bolts, washers, and locking nuts. Next, there is an electrically powered actuator 40 with piston 42 that can be attached to the rear 18 of the platform by a pivot point 43 using a ½" bolt, washer, and lock nut.

The other end of the actuator 40 motor end 43, gets attached to the underside 7 of the boat using ⅜" bolts, washers, and lock nuts. A wiring harness can be plugged into the actuator 40 and limit switch. The other end goes thru the deck 6 of the boat to a switch panel that gets mounted on or near the actuator control 50.

To operate the platform system 10, the installer must first flip the power switch on the actuator control 50 to the "on" position. Next depress the "out" rocker switch and hold until the platform fully deploys. To retract the platform 13, power switch "on", then depress the "in" rocker switch and hold until the platform 13 fully retracts. A beeper can sound when the platform 13 is in motion. There is also a beeper that sounds when the operator tries to start the boat without the platform 13 being fully retracted. The beeper can continue to sound until the platform hits the limit switch which lets the operator know that the platform 13 is safely stowed.

The concept is for the actuator 40 to push the platform rear 18 forward until each arm 24, 26 presses firmly into a set of grooves 33, 35 in the stops 32, 34, automatically by the push of a button. The stops 32, 34 not only provide a stopping point for each arm 24, 26 but also provide stability for side to side movement. This allows the platform 13 to extend past the nose of the boat and drop down to provide a safe step onto shore or provide a platform 13 for a swimmer to get onto the boat safely. Another push of a button also stows the platform by pulling the platform 13 towards the actuator until the platform 13 itself seats on grooves 35, 39 on the stops 34, 38.

While the stops can be used to limit fully stowed or fully extended positions, the operator can further adjust the extension and lowering of the platform to selected heights and extensions. For example, the operator can remove their finger from the button control which can limit the lowering and extension positions.

Although the preferred embodiment shows an automatic motor controlled platform system, the invention can be used without the actuator to be manually controlled. For example, an operator can pull or push the platform, where latches can be used to lock the platform in the raised retracted position, and lock the platform in selected lowered and extended positions.

The components used in the invention can be formed from non-corrosive or corrosive resistant materials, such as but not limited to fiberglass composite, polyethylene composite, nitrile butadiene, rubber compound, polyvinyl chloride compound, aluminum alloys, stainless steel alloys, plastic, wood, combinations thereof and the like.

In the retracted position, the swim platform can be approximately 6 inches beneath the pontoon platform deck. In the extended position, the swim platform can be lowered another approximately 6 inches to be close to the water level.

The term "approximately" can be +/−10% of the amount referenced. Additionally, preferred amounts and ranges can include the amounts and ranges referenced without the prefix of being approximately.

Although the invention describes using the retractable and extendable lowerable horizontal platform for pontoon boats, the invention can have other applications. For example, the retractable and extendable lowerable platform can be used with docks and/or raised decks or other marine platforms over water.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A retractable and extendable swim platform system for pontoon boats having a platform deck supported by spaced apart pontoon floats, comprising:

a first elongated channel having a generally upside down U shape with an open bottom being mountable underneath the platform deck between pontoon floats;

a second elongated channel having a generally upside down U shape and an open bottom being mountable in a parallel orientation to the first elongated channel underneath the platform deck between the pontoon floats;

a first moveable frame having first swing arms each being parallel to one another, the first parallel swing arms having upper ends pivotally attached inside of the first elongated channel by bolts passing through both sides of the first elongated channel, and each of the first parallel swing arms having lower ends;

a second moveable frame having second swing arms each being parallel to one another, the second parallel swing arms having upper ends pivotally attached inside of the second elongated channel by bolts passing through both sides of the second elongated channel, and each of the second parallel swing arms having lower ends; and a swim platform having a rearwardly extending first side and a rearwardly extending second side, the lower ends of the first parallel swing arms being pivotally attached to the rearwardly extending first side of the swim platform, and the lower ends of the second parallel swing arms being pivotally attached to the rearwardly extending second side of the swim platform, wherein the swim platform has a retracted position with the swim platform in a raised horizontal position beneath the platform deck between the pontoon floats, and the platform being moveable to an extended lowered horizontal position extending out from the pontoon floats, without tracks for sliding or rolling the swim platform therefrom; and stops extending downward from inside of the first elongated channel and from inside of the second elongated channel, the stops for limiting extension of the first parallel swing arms and the second parallel swing arms pivotal members of the first and the second moveable frames in the extended position and preventing side to side swaying of the swim platform in the extended position.

2. The retractable and extendable swim platform system of claim 1, wherein the stops include: rubber material.

3. The retractable and extendable swim platform system of claim 1, wherein the stops include V shaped groove ends which fit into portions of the rearwardly extending first and the second sides of the swim platform, which prevents the swim platform from moving sideways.

4. The retractable and extendable swim platform system of claim 3, wherein the first elongated channel and the second elongated channel, each includes:
a pair of the stops having rearwardly facing outer ends; and
a single stop having a flat outer end parallel to the first elongated channel and the second elongated channel.

5. The retractable and extendable swim platform system of claim 1, further comprising:
an actuator that when activated automatically moves the retractable platform to the extended position, or moves the extended platform to the retracted position.

6. A retractable and extendable swim platform system for marine platforms having a raised platform deck supported over a water surface, comprising:
a first elongated channel having a generally upside down U shape with an open bottom being mountable underneath a marine platform deck;

a second elongated channel having a generally upside down U shape and an open bottom being mountable in a parallel orientation to the first elongated channel underneath the marine platform deck;

a first moveable frame having first swing arms each being parallel to one another, the first parallel swing arms having upper ends pivotally attached inside of the first elongated channel by bolts passing through both sides of the first elongated channel, and each of the first parallel swing arms having lower ends;

a second moveable frame having second swing arms each being parallel to one another, the second parallel swing arms having upper ends pivotally attached inside of the second elongated channel by bolts passing through both sides of the first elongated channel, and each of the second parallel swing arms having lower ends; and a moveable platform having a rearwardly extending first side and a rearwardly extending second side, the lower ends of the first parallel swing arms being pivotally attached to the rearwardly extending first side of the moveable platform, and the lower ends of the second parallel swing arms being pivotally attached to the rearwardly extending second side of the moveable platform, wherein the moveable platform has a retracted position with the platform in a raised horizontal position beneath the platform deck, and the moveable platform being moveable to an extended lowered horizontal position extending out from the raised platform deck, without tracks for sliding or rolling the moveable platform therefrom; and stops extending downward from inside of the first elongated channel and from inside of the second elongated channel, the stops for limiting extension of the first parallel swing arms and the second parallel swing arms pivotal members of the first and the second moveable frames in the extended position and preventing side to side swaying of the moveable platform in the extended position.

7. The retractable and extendable swim platform system of claim 6, wherein the stops include: rubber material.

8. The retractable and extendable swim platform system of claim 6, wherein the stops include V shaped groove ends which fit into portions of the rearwardly extending first and the second sides of the moveable platform, which prevents the moveable platform from moving sideways.

9. The retractable and extendable swim platform system of claim 8, wherein the first elongated channel and the second elongated channel, each includes:
a pair of the stops having rearwardly facing outer ends; and
a single stop having a flat outer end parallel to the first elongated channel and the second elongated channel.

10. The retractable and extendable swim platform system of claim 6, further comprising:
an actuator that when activated automatically moves the moveable platform to the extended position, or moves the moveable platform to the retracted position.

11. The retractable and extendable swim platform system of claim 6, wherein the marine platform deck is a dock.

12. The retractable and extendable swim platform system of claim 6, wherein the marine platform deck is a boat.

13. The retractable and extendable swim platform system of claim 6, wherein the marine platform deck is a floating platform.

* * * * *